United States Patent [19]

Amberger et al.

[11] Patent Number: 4,942,937
[45] Date of Patent: Jul. 24, 1990

[54] LOCKING DEVICE FOR A GEARSHIFT LEVER

[75] Inventors: Franz Amberger, Altmannstein; Wilhelm Bois, Gaimersheim, both of Fed. Rep. of Germany

[73] Assignee: Audi AG, Fed. Rep. of Germany

[21] Appl. No.: 322,370

[22] Filed: Mar. 13, 1989

[30] Foreign Application Priority Data

Oct. 21, 1988 [DE] Fed. Rep. of Germany ....... 3835946

[51] Int. Cl.⁵ .................. B60K 20/00; B60K 41/06
[52] U.S. Cl. .................................. 180/271; 192/4 A
[58] Field of Search .................. 192/4 A, 4 C, 9; 70/245, 247, 248, 251, 257; 74/483 K, 483 R; 180/336, 271

[56] References Cited

U.S. PATENT DOCUMENTS

| | | | |
|---|---|---|---|
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,572,340 | 2/1986 | Pierce | 192/4 C |
| 4,768,610 | 9/1988 | Pagel et al. | 192/4 A |

FOREIGN PATENT DOCUMENTS

| | | | |
|---|---|---|---|
| 1203756 | 4/1986 | Canada | 180/271 |
| 0246353 | 11/1987 | European Pat. Off. | 180/271 |

*Primary Examiner*—Charles A. Marmor
*Assistant Examiner*—Karin Tyson
*Attorney, Agent, or Firm*—Lalos & Keegan

[57] ABSTRACT

In an automatic transmission, a sensor switch is provided to monitor movement of the gearshift lever from the park position. If the gearshift lever is moved out of the park position when the ignition is off and/or the brake is not activated, the switch responds to such conditions by exciting a locking device which inhibits further movement of the gearshift lever from the park position. The locking device requires current only when the gearshift lever is being moved from the park position.

7 Claims, 3 Drawing Sheets

LOCKING DEVICE FOR A GEARSHIFT LEVER

BACKGROUND OF THE INVENTION

This invention relates generally to a gearshift lever for automatic transmissions and more particularly to a locking device for gearshift levers that are moved through a series of positions to effect different operating and drive conditions of the transmission.

A problem occurring in automobiles with automatic transmissions is the inadvertent movement of the car resulting from a driver changing the gearshift lever from the park position to a drive position while inadvertently stepping on the gas pedal rather than the intended action of stepping on the brake pedal. It is thus desirable to provide a lockable gearshift lever in automatic transmissions that require the driver to keep his foot on the brake pedal in order to move the gearshift lever from the park position and into a driving position.

In addition to controlling movement of the gearshift lever out of the park position when the ignition is on and the motor is running, it is also desirable to control movement of the gearshift lever when the ignition is off. Even if the motor is not running the car may move forward or backward if it is on an inclined surface when the gearshift lever is moved out of the park position. One method for locking the gearshift lever is to provide an electrically activated locking device that locks the lever in response to a continuous electrical signal. However, such method is not effective when the ignition is off because the electrical power of the battery is insufficient to meet the power consumption needs of the electrical locking device.

Another possible solution to the proposed problem is to electrically connect the locking device such that in an electrically excited condition the locking device releases the gearshift lever, while in an unexcited condition the gearshift lever remains blocked. This ensures that, when the ignition is off, the gearshift lever remains locked in the park position. The locking device can become electrically operable to release the gearshift lever only when the ignition is turned on and the brake pedal is depressed. This proposed solution provides a disadvantage in that the lock must be electrically powered in an unlocked position during the entire period that the car is being operated. Further, the mechanical locking devices previously suggested have been subject to wear on the bolts connecting the locking device since the locking device is engaged for a substantial amount of time (i.e. while the car is not running).

It is therefore an object of the present invention to provide a locking device for the gearshift lever of an automatic transmission that effectively locks the gearshift lever in the park position, that consumes a minimum of electric current, and that does not release the gearshift lever from the park position even when the ignition is shut off. In summary, the present invention provides a switch that is activated when an attempt is made to move the gearshift lever from neutral in the park position into one of the drive positions. The switch detects the initial movement of the gearshift lever and activates the locking device unless certain other criteria are met. The locking device, thus activated, securely holds the gearshift lever in the park position preventing its movement into one of the drive positions. The present invention places a negligible load on the capacity of the battery by ensuring that current flow occurs only during the time in which an attempt is made to move the gearshift lever out of the park position.

DETAILED DESCRIPTION

Figure 1:
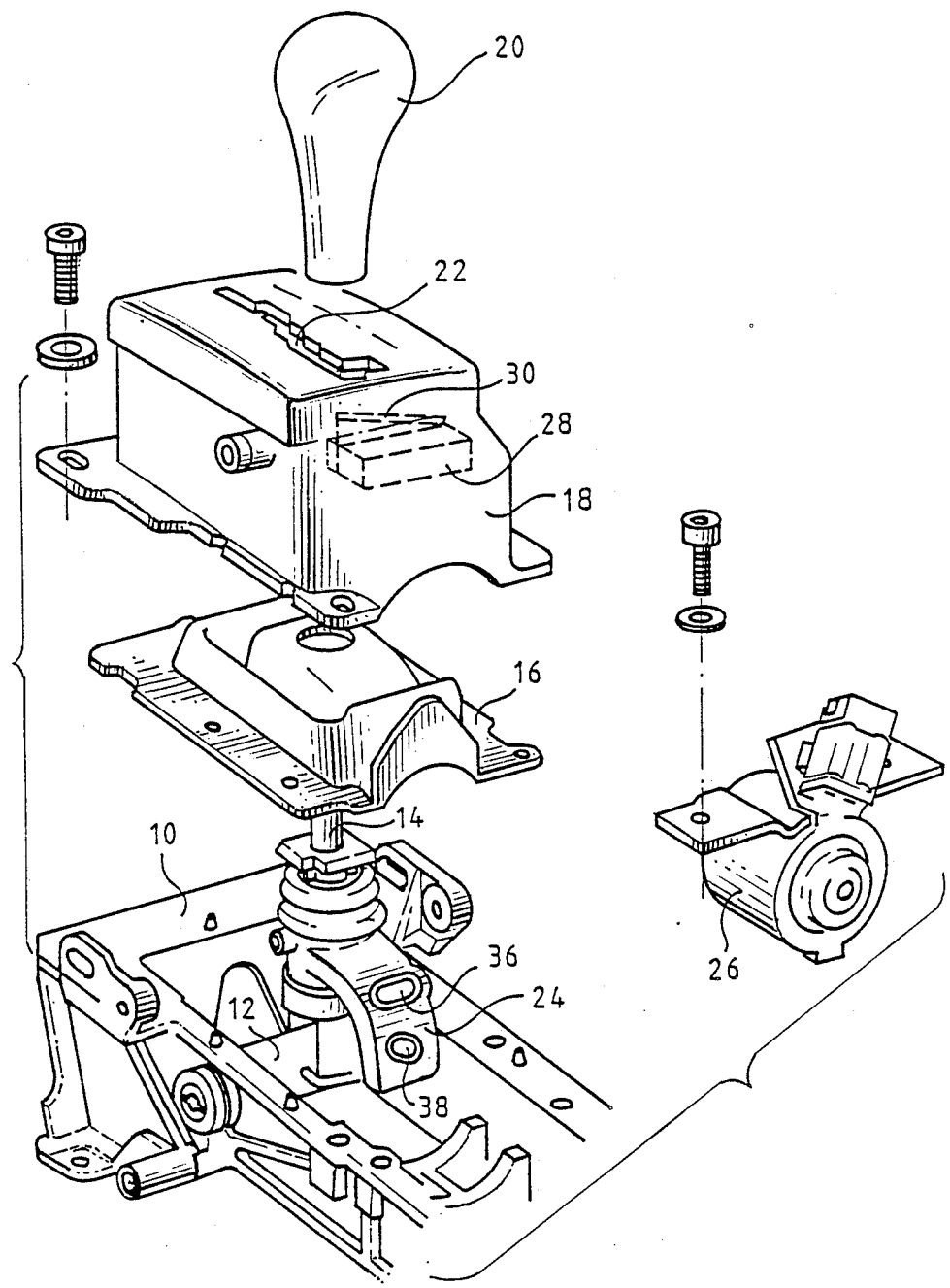
FIG. 1 is an exploded sectional view of a gearshift lever for an automatic transmission and illustrating the switch of the present invention.

FIG. 1 illustrates a gearshift lever for an automatic transmission. The gearshift lever 14 is rotatably connected on an axle 12 within a frame 10. The gear selected in the automatic transmission is determined by the degree of incline of the gearshift lever 14. A boot 16 provides a subassembly cover and the entire assembly is covered by a gate 18. Attached to the upper end of the gearshift lever 14 is a shift stick handle 20. The gate 18 includes a gate slot 22 through which the gearshift lever 14 is maneuvered.

Figure 2:
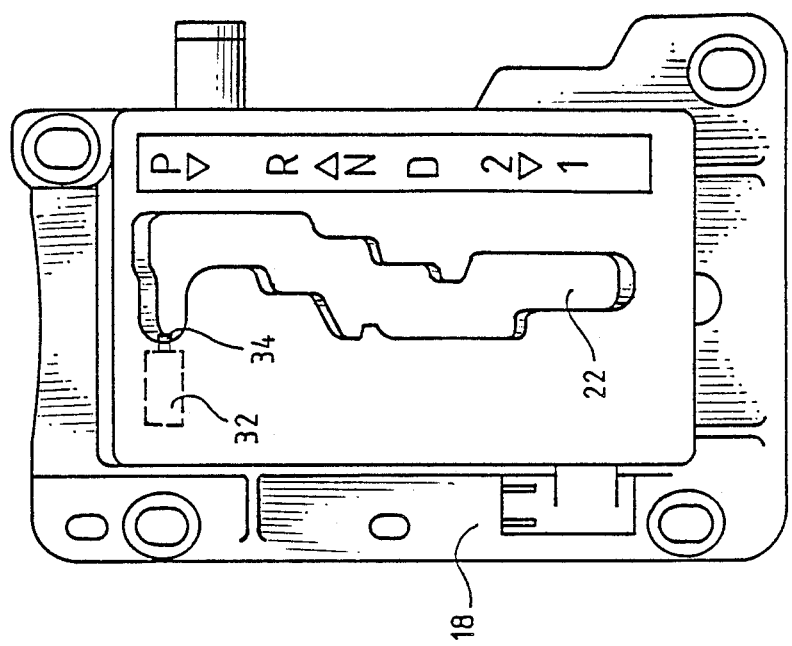
FIG. 2 is a plan view of a gate for the gearshift lever showing one embodiment of the switch of the present invention.
Figure 3:
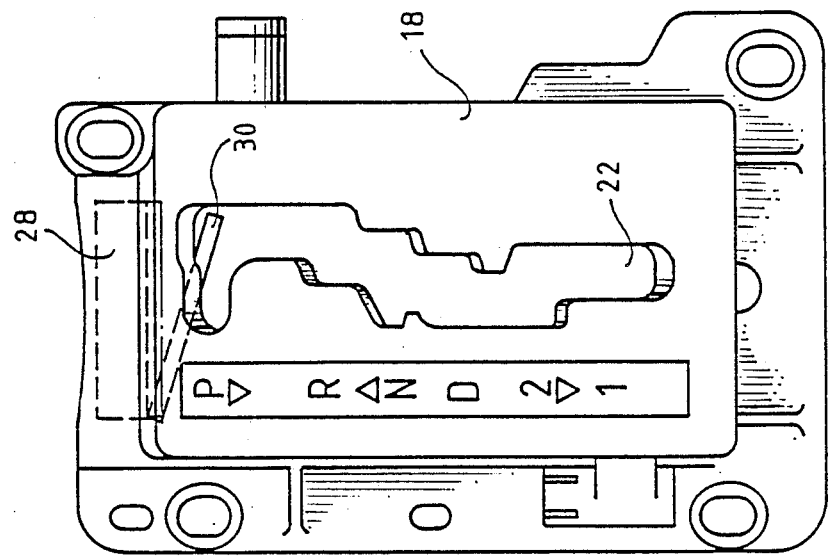
FIG. 3 is a plan view of a gate for the gearshift lever showing a second embodiment of the switch of the present invention.

Within frame 10, an arch-shaped extension piece 24, including two openings, is provided at the lower end of the gearshift lever 14. As the gearshift lever 14 is rotated about axle 12, the arch-shaped piece 24 slides past a solenoid 26, also mounted to frame 10. The arch-shaped piece 24 is rotatably positioned such that an armature 27 of solenoid 26 engages hole 36 or 38 of piece 24 when solenoid 26 is electrically excited. The hole 38 is positioned opposite solenoid 26 when the gearshift lever 14 is positioned in the neutral (N) position in gate slot 22, as best shown in FIGS. 2 and 3. The hole 36 is positioned opposite the solenoid 26 when gearshift lever 14 is positioned in the park (P) position of gate slot 22.

When solenoid 26 is electrically excited and gearshift lever 14 is in the park position, the solenoid armature 27 engages hole 36 and gear shift lever 14 is thereby prevented from rotational movement on axle 12. Thus, the gearshift lever 14 is locked in the park position.

As shown in FIG. 1, sensor switch 28 of the present invention, laterally attached to gate 18, includes a pivoted lever or a sensor lever 30. As best seen in FIG. 2, the sensor lever 30 projects into slot 22 in the path of motion of gearshift lever 14 when lever 14 is moved from the park (P) position within gate slot 22. Thus, the movement of gearshift lever 14 out of the park position results in contact between gearshift lever 14 and lever 30 of switch 28 thereby activating switch 28 in an electrical circuit. The circuit, shown in FIG. 4 and described hereafter, is connected to solenoid 26 in a conventional manner and causes solenoid 26 to extend its armature 27 through hole 36 when sensor switch 28 is activated. This action effectively prohibits gear shift lever 14 from further rotational movement on axle 12 and thus prevents any further movement of lever 14 out of the park position. Thus, gearshift lever 14 is locked in the park position.

FIG. 3 illustrates an alternative embodiment for the sensor switch of the present invention. As shown, the sensor switch 32 includes a spring-activated pin 34. With the gearshift lever 14 in the park position, the pin 34 is depressed and switch 32 is inactive. If an attempt is made to move gearshift lever 14 out of the park position, spring-activated pin 34 is driven outward thus activating switch 32. Again, switch 32 is connected to solenoid 26 through a conventional circuit to electrically excite solenoid 26 when switch 32 is activated. Thus gearshift lever 14 is prevented from further rotation on axis 12 and is effectively locked in the park position.

With the sensor switch 28 or 32 of the present invention, the locking device, i.e. solenoid 26, consumes power only when switch 28 or switch 32 is activated when an attempt is made to move gearshift lever 14 out of the park position. Sensor switches 28 and 32 are illustrated as mechanical switches. However many other comparable devices could be used to sense the movement of gearshift 14 from the park position. Examples of comparable devices include a magnet attached to gearshift lever 14 operable with a corresponding reed relay, a light barrier, or another mechanical, optical, or electrical proximity switch.

The sensor switch 28 or 32 of the present invention can be electrically connected in a conventional manner such that it is disabled when the ignition is turned on and the brake pedal is activated, or alternatively, when the motor is running and the brake pedal is activated. Under these preset conditions, the switch 28 or 32 will be deactivated thus allowing the gearshift lever to be moved out of the park position without activating solenoid 26. However without the preset conditions being present, the gearshift lever will be prevented from movement out of the park position by the combination of switch 28 or 32 and solenoid 26 as previously described. In the embodiment shown in FIG. 2, once the gearshift lever 14 is moved past and out of contact with sensor lever 30, the lever 30 returns to its inactive position, thus deactivating switch 28.

Figure 4:
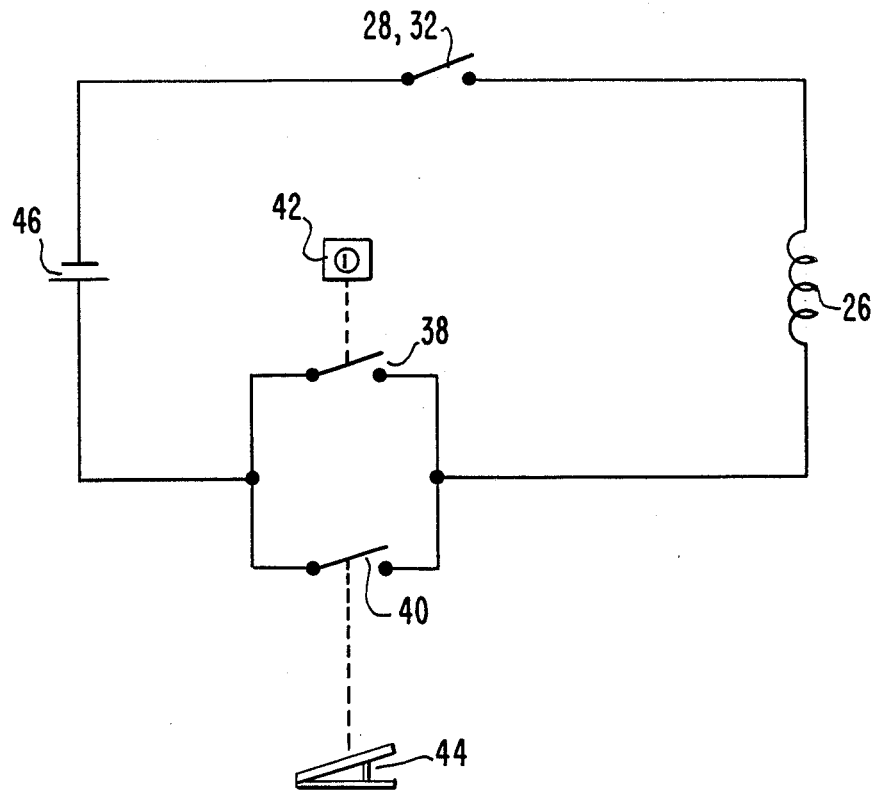
FIG. 4 is a diagram of an electrical circuit for the present invention.

FIG. 4 illustrates a typical electrical circuit that will provide the desired functional relationship between the sensor switch 28 or 32, a power source (e.g. battery 46), solenoid 26, the ignition switch, and the brake pedal. The circuit includes two control switches 38 and 40 connected in parallel. Switch 38 can be connected in any conventional manner (dashed line) to the auto ignition switch, shown generally at 42, such that control switch 38 is closed when the ignition is off and open when the ignition is on. Similarly, control switch 40 can be connected in any conventional manner (dashed line) to the auto brake pedal, shown generally at 44, such that control switch 40 is closed when the brake pedal is not depressed and open when the brake pedal is depressed. With the circuit of FIG. 4, closing (activating) sensor switch 28 or 32 (through movement of gearshift 14 out of the park position) will electrically activate solenoid 26 through battery 46 (thus locking gearshift lever 14) unless the ignition is on and the brake pedal is depressed.

The unique apparatus of the present invention requires power only during an attempted movement of the gearshift lever out of the park position and yet effectively locks the gearshift lever in the park position when the ignition is off or in the instance where the ignition is on and the car is running but the driver fails to depress the brake pedal. Thus the driver is prevented from inadvertently stepping on the gas pedal rather than the brake when shifting the gear lever from park into one of the drive positions.

The present invention provides advantages over the prior art in that the locking device is activated and requires power only when an attempt is made to move the gearshift lever out of the park position. The present invention is effective even when the ignition is off or the motor is not running and places a minimum load on the battery in these instances. Further modifications and embodiments will become apparent to those having ordinary skill in the art while still falling within the scope of the invention as defined by the claims.

We claim:
1. Apparatus for an automatic transmission including:
   a gearshift lever movable into various positions to effect different operating and drive conditions of said transmission;
   an electrically excitable locking device for locking said gearshift lever in a park position;
   a sensor switch for monitoring the position of said gearshift lever and being responsive to movement of said gearshift lever from said park position for electrically exciting said locking device to lock said gearshift lever in said park position.

2. Apparatus as defined in claim 1 wherein said gearshift lever moves through a predetermined path when being moved out of said park position, and said sensor switch includes a spring activated sensor lever that projects into said predetermined path such that when said gearshift lever is moved out of said park position the gearshift lever contacts said sensor lever moving it from an inactive position to an activating position thereby activating said sensor switch.

3. Apparatus as defined in claim 2 wherein said sensor lever is returned to said inactive position when said gearshift lever continues to move along said predetermined path and no longer contacts said sensor lever.

4. Apparatus as defined in claims 1, 2, or 3 wherein said automatic transmission is installed in a vehicle including a brake pedal that can be depressed to activate a brake and wherein said locking device includes a solenoid, and said brake pedal, sensor switch and solenoid being electrically connected such that said sensor switch is responsive to movement of said gearshift lever to excite said solenoid only if said brake pedal is not depressed.

5. Apparatus as defined in claims 1, 2, or 3 wherein said automatic transmission is installed in a vehicle including a brake pedal that can be depressed to activate a brake and an ignition switch that can be placed in an on position and wherein said locking device includes a solenoid, and said brake pedal, ignition switch, sensor switch and solenoid being electrically connected such that said sensor switch is responsive to movement of said gearshift lever to excite said solenoid only if said ignition is not in the on position and said brake pedal is not depressed.

6. Apparatus as defined in claim 1 wherein said gearshift lever includes an extension piece and said locking device includes a solenoid, said extension piece including an opening, and said opening of said extension piece being positioned opposite said solenoid when said gearshift lever is positioned in said park position.

7. Apparatus as defined in claim 1 wherin said solenoid is electrically activated by said sensor switch and said solenoid includes an armature that engages said opening in said extension piece when said solenoid is activated by said sensor switch, thereby locking said gearshift lever in said park position.

* * * * *